United States Patent [19]

Niskanen

[11] Patent Number: 5,493,931
[45] Date of Patent: Feb. 27, 1996

[54] VEHICLE SHIFTER

[75] Inventor: Don L. Niskanen, Spring Lake, Mich.

[73] Assignee: Grand Haven Stamped Products Company, Div. of JSJ Corp., Grand Haven, Mich.

[21] Appl. No.: 195,331

[22] Filed: Feb. 14, 1994

[51] Int. Cl.⁶ ............................ F16H 59/04; G05G 9/053
[52] U.S. Cl. .......................................... 74/473 R; 267/150
[58] Field of Search ........................... 74/473 R, 471 XY, 74/473 P; 267/150

[56] References Cited

U.S. PATENT DOCUMENTS

| | | |
|---|---|---|
| 2,100,642 | 11/1937 | Geyer. |
| 3,483,888 | 12/1969 | Wurzel. |
| 3,811,018 | 5/1974 | Kaplan. |
| 4,269,081 | 5/1981 | Peterson et al.. |
| 4,333,360 | 6/1982 | Simmons. |
| 4,457,188 | 7/1984 | Hauser ................................ 74/473 P |
| 4,569,245 | 2/1986 | Feldt et al.. |
| 4,581,951 | 4/1986 | Watson ................................ 74/473 R |
| 4,781,074 | 11/1988 | Long .................................... 74/476 X |
| 4,784,008 | 11/1988 | Paquereau et al.. |
| 5,029,488 | 7/1991 | Buhl et al. ........................... 74/473 P |
| 5,313,853 | 5/1994 | Olmstead et al. .................. 74/473 P X |

*Primary Examiner*—Rodney H. Bonck
*Assistant Examiner*—Troy Grabow
*Attorney, Agent, or Firm*—Price, Heneveld, Cooper, DeWitt & Litton

[57] ABSTRACT

A shifter for a manual transmission of a vehicle includes a shift stick configured to operably engage the transmission, and a base adapted for mounting to the vehicle and configured to pivotally support the shift stick for movement about first and second orthogonal axes. In particular, a trunnion is pivotally mounted to the base for movement about the first axis, and the shift stick is configured to pivotally engage the trunnion for movement about the second axis, the shift stick being configured to move with the trunnion as a unit when pivoted about the first axis. A plate spring is compressively mounted on the base and the trunnion is configured to operably engage the spring so that the spring biases the trunnion and shift stick to a neutral position about the first axis but so that the spring does not bias the shift stick when pivoted about the second axis. The trunnion is configured so that the second axis is located closer to the transmission than the first axis so that the shift stick provides more mechanical advantage when shifting about the second axis than the first axis.

13 Claims, 3 Drawing Sheets

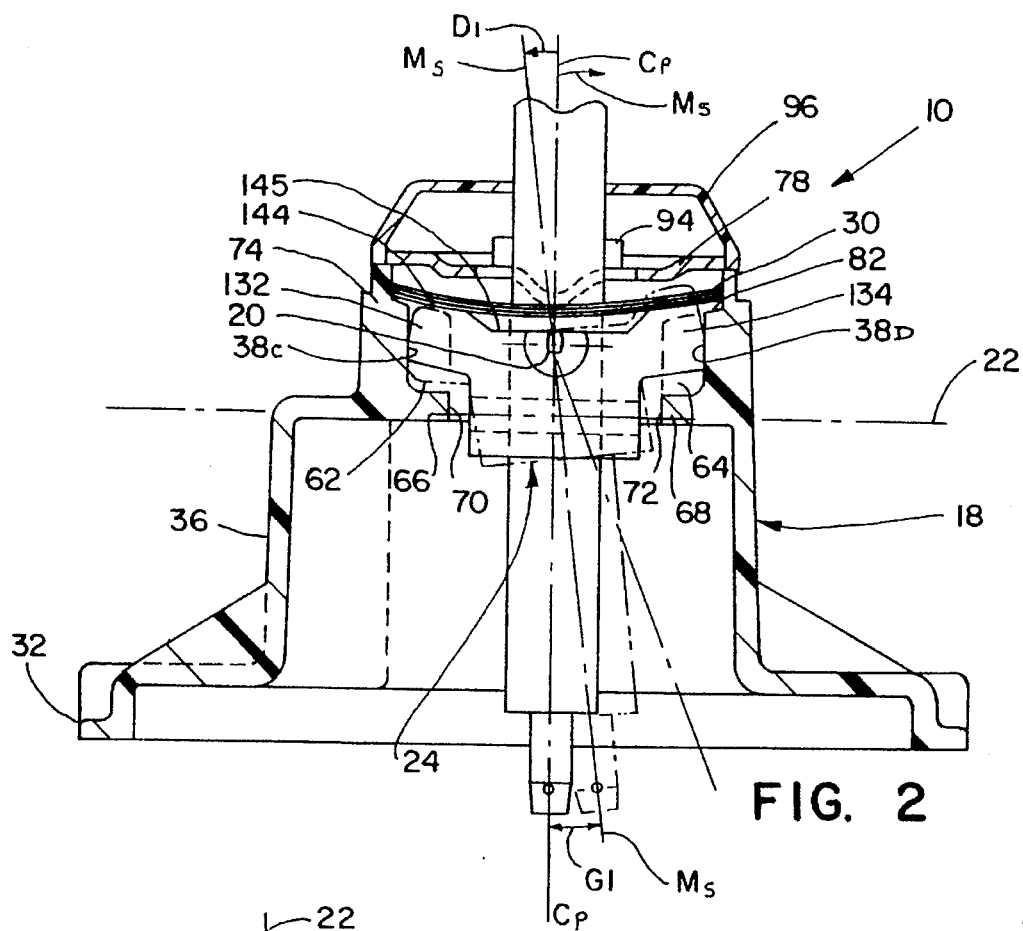
FIG. 2
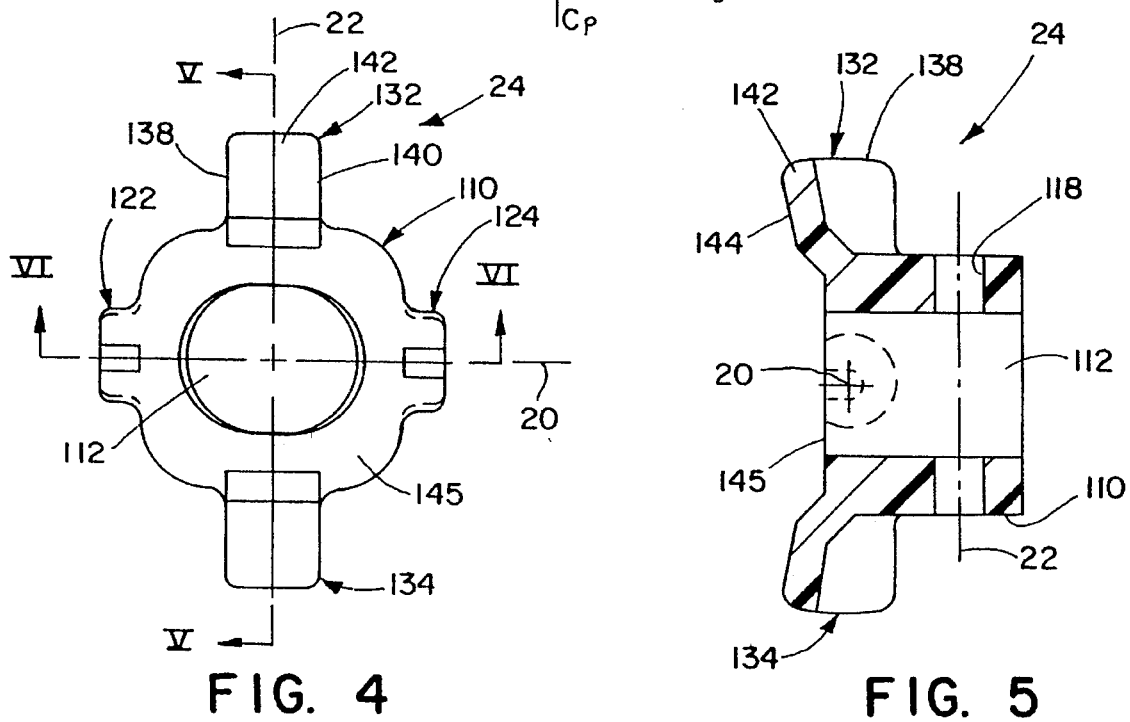
FIG. 4
FIG. 5

VEHICLE SHIFTER

BACKGROUND OF THE INVENTION

The present invention concerns automotive shifters, and in particular concerns a shifter for manual transmissions adapted for improved shifting in a gear engaging direction.

Manual transmissions (i.e. manually shifted transmissions) for automobiles include shift sticks that are typically shifted in an "H" type pattern or similar patterns about orthogonal axes of rotation. In such patterns, the line segment at the center of the H represents neutral and typically extends side-to-side of the vehicle, while the remaining line segments extend forwardly and rearwardly of the vehicle and represent gear engaging shift directions. It is desirable to provide significant/mechanical advantage to the shift stick in the gear engaging shift direction to reduce transmission induced shift loads on the operator. This is typically done by shortening the lower portion of the shift stick below the axis of rotation and lengthening the upper portion of the shift stick above the axis of rotation, thus providing mechanical advantage to the operator when shifting. However, this results in a wide swing in the handle at the upper end of the shift stick, which is unacceptable, particularly in the side-to-side direction.

For example, the shifter of U.S. Pat. No. 07/992,243 and entitled "Flat Spring Biased Shifter" exhibits this problem in the event that a greater than normal shifting force is required to shift the transmission. In such a shifter the orthogonal axes of rotation defined by the ball-and-socket pivot arrangement of the shifter intersect. This causes an unresolvable problem since if the ball-and-socket pivot is positioned lower on the shift stick (i.e. the ratio of the upper-to-lower length of the shift stick is increased) for more leverage when shifting forwardly/rearwardly into gear, the shift stick upper end travels unacceptably far during side-to-side movement. Contrastingly, if the ball-and-socket pivot is positioned higher on the shift stick (i.e. the ratio of the upper-to-lower length of the shift stick is reduced), the shift stick lacks the desired level of mechanical advantage for gear engaging shift movement. Further, it is noted that there are spacial constraints on how close the ball-and-socket can be positioned to the transmission while still meeting other functional requirements of the shifters.

Thus, a shifter solving the aforementioned problems is desired.

SUMMARY OF THE INVENTION

The present invention is embodied in a shifter for a vehicle transmission including a shift stick having a lower end configured to operably engage the transmission and a base adapted to pivotally mount the shifter to the transmission. A trunnion is pivotally mounted to the base for movement about a first axis from side-to-side of the vehicle, and includes means for pivotally receiving the shift stick for forward/rearward gear engaging movement about a second axis positioned orthogonally to the first axis. The shift stick includes a pivot forming member configured to pivotally engage the pivot receiving means on the trunnion. A plate spring is operably mounted to the base in a position engageable by the trunnion for biasing the shift stick to a neutral position about the first axis.

The illustrated preferred embodiment includes several advantages over known art. The second axis permitting gear engaging movement is located closer to the transmission than the first axis so that the shift stick provides increased mechanical advantage to the operator to overcome shift loads when the shift stick is moved about the second axis. Further, the trunnion is configured to biasingly engage the spring only when moved about the first axis so that the shift stick is biased only about the first axis and thus the operator does not need to overcome the bias of the spring when rotating the shift stick about the second axis.

These and other features, advantages and aspects of the present invention will be further understood by a person of ordinary skill in the art when considered with the attached description of a preferred embodiment, the claims and appended drawings.

BRIEF DESCRIPTION OF THE DRAWINGS

FIG. 2 is a front cross-sectional view of the shifter in FIG. 1, the section being taken along the second axis orthogonal to the first axis;

FIG. 4 is a plan view of the trunnion shown in FIG. 1;

FIG. 5 is a side sectional view taken along the lines V—V in FIG. 4;

DETAILED DESCRIPTION OF THE PREFERRED EMBODIMENT

Figure 1:
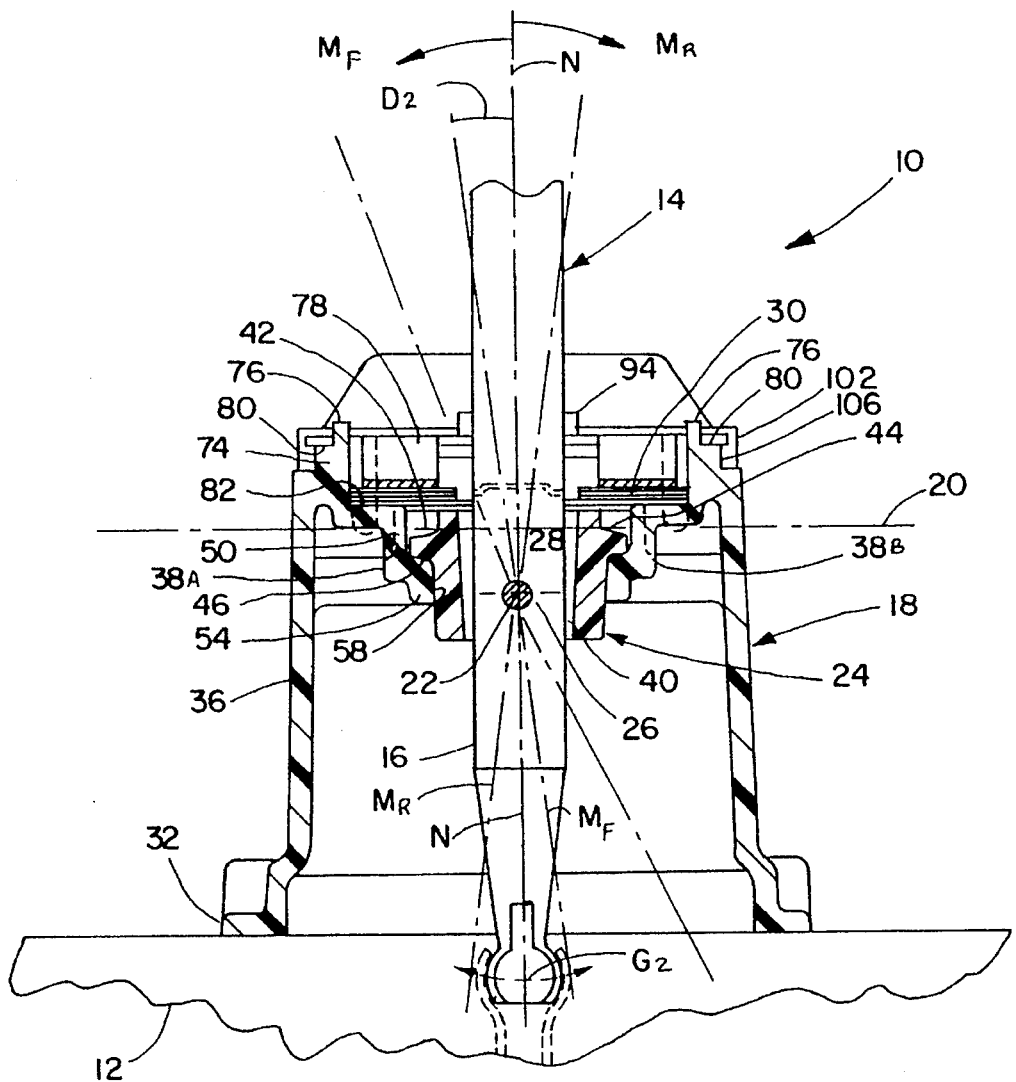
FIG. 1 is a side cross-sectional view of a shifter embodying the present invention, the section being taken along a first axis so that the shifter is viewed from a side as positioned in the vehicle.

A shifter 10 (FIGS. 1 and 2) embodying the present invention is particularly suited for use with a manual transmission 12 for a vehicle such as an automobile. The shifter 10 includes a shift stick 14 having a lower end 16 configured to operably engage the transmission 12, and a base 18 adapted to pivotally mount the shifter 10 to the vehicle for movement about first and second orthogonal axes 20 and 22, respectively. A trunnion 24 is pivotally mounted to the base 18 for side-to-side movement "$M_S$" about the first axis 20 (FIG. 2), and includes pivot receiving surfaces 26 shaped to pivotally receive the shift stick 14 for movement about the second axis 22 (FIG. 1 ). The shift stick 14 includes a pivot pin 28 attached to the lower end of shift stick 14 configured to pivotally engage the pivot receiving surfaces 26 on the trunnion 24 for forward and rearward gear engaging movement "$M_F$" and "$M_R$" about second axis 22. A set of disc-shaped, plate-like springs 30 are operably retained on the base 18 in a position engageable by the trunnion 24 so that the shift stick 14 is continually biased to a central position "CP" about the first axis 20 (FIG. 2). Trunnion 24 allows the second axis 22 to be positioned close to the transmission 12 (closer than first axis 20) so that more mechanical advantage is provided for shifting against shift loads encountered when shifting about the second axis 22, but allows first axis 20 to be positioned relatively farther from transmission 12 so that the side-to-side movement of shift stick 14 is acceptably limited.

Figure 3:
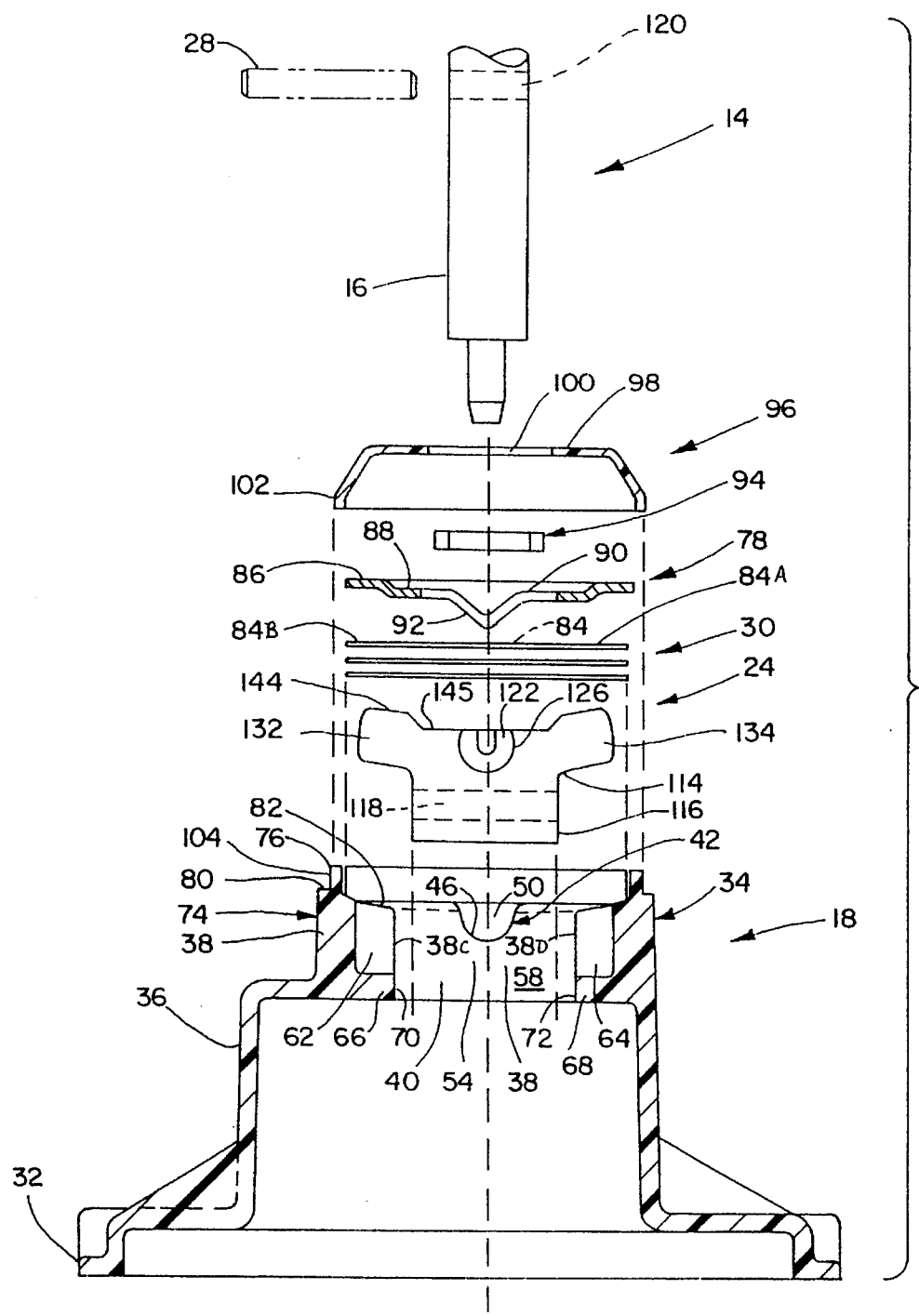
FIG. 3 is an exploded view of the shifter as illustrated in FIG. 2.

More particularly, base 18 (FIG. 3) includes a bottom 32 configured for attachment to transmission 12, and a trunnion supporting mount 34 supported on bottom 32 by geometrically-shaped sidewall 36. Mount 34 includes a ring-shaped wall 38 that extends around the inside of the top of sidewall 36. Ring-shaped wall 38 defines an aperture 40 that operably receives trunnion 24 and the lower end of shift stick 14. Aperture 40 is generally rectangularly-shaped with generously radiused corners, and is shaped to mateably receive trunnion 24 and allow trunnion 24 to pivot about first axis 20 as described hereinafter. Aperture 40 is defined by opposing sides 38A and 38B (FIG. 1) that are oriented perpendicularly to first axis 20, and opposing sides 38C and 38D (FIG. 2) that are oriented perpendicularly to second axis 22.

The sides 38A (and 38B) (FIG. 3) include a pair of semicylindrically-shaped recesses 42 (and 44). Recesses 42 and 44 include bearing surfaces 46 that define first axis 20 and are configured to pivotally support trunnion 24. Recesses 42 and 44 are closed at their outer ends by wall material 50 and are supported at their inner ends by downwardly extending webs 54. Webs 54 include inner surfaces 58 that define the lower sides of aperture 40 in the direction of axis 20 (FIG. 1).

The other sides 38C and 38D (FIG. 3) include a pair of upwardly opening channels 62 and 64 that extend generally vertically on sides 38C and 38D, respectively. Channels 62 and 64 are located generally at the same height as recesses 42 and 44 but extend below and above recesses 42 and 44. Webs 66 and 68 close the bottoms of channels 62 and 64 and include inner surfaces 70 and 72 that define the lower sides of aperture 40 in the direction of axis 22.

A crown-shaped wall 74 (FIG. 1) extends upwardly from mount 34. Crown-shaped wall 74 includes alignment tines 76 for attachment of a spring compressing retainer 78, and a shoulder 80 for setting the depth of the spring compressing retainer 78. The upper surface 82 of ring-shaped wall 38 inside of crown-shaped wall 74 is generally arcuately-shaped in the direction of first axis 20 (FIGS. 2 and 3), but defines linear segments in the direction of second axis 22 (FIG. 1).

The set of normally planar washer-like, disc-shaped springs 30 (FIG. 3) are shaped to mateably engage upper surface 82 of ring-shaped wall 38. As many springs 30 may be used as desired and further, the resiliency/stiffness of the springs may be chosen to create the desired amount of bias as springs 30 are engaged by trunnion 24. Preferably, the springs 30 are generally planar and circularly-shaped and have a hole 84 so that they may be positioned in ring-shaped wall 38 without regard to orientation. This facilitates manufacture of springs 30 and provides a more consistent assembly. However, rectangular and non-planar shapes can also be used if desired. The spring compressing retainer 78 has a generally planar perimeter 86 adapted to mateably engage crown-shaped wall 74. The inner portion 88 of spring compressing retainer 78 defines an aperture 90 for receiving shift stick 14 therethrough and further includes a ridge 92 that extends in a direction parallel first axis 20. Ridge 92 is elongated and engages springs 84, thus forcing the springs 84 against upper surface 82 and into the bowed shape of upper surface 82. Retainer 86 is held to mount 34 by four screws (not shown). Retainer 78 compresses and tensions springs 84 against mount upper surface 82, with opposing spring halves 84A and 84B extending in an arcuate shape above upper surface 82.

A retainer cover 96 (FIG. 3) is positioned over spring compressing retainer 78 to exclude contaminates from the shifter base 12. Retainer cover 96 includes a center section 98 attached to an integral ring 94 that mateably receives shift stick 14, and further includes a lipped perimeter 102 for mateably securely engaging an outer edge 104 of crown-shaped wall 74. Outer edge 104 of wall 74 includes a depression 106 (FIG. 1) to receive lipped perimeter 102. Retainer cover 96 is made of a rubber that flexes to follow stick 14 as it is moved. Retainer cover 96 is frictionally engaged on base 18 or is otherwise secured to base 18.

Figure 6:
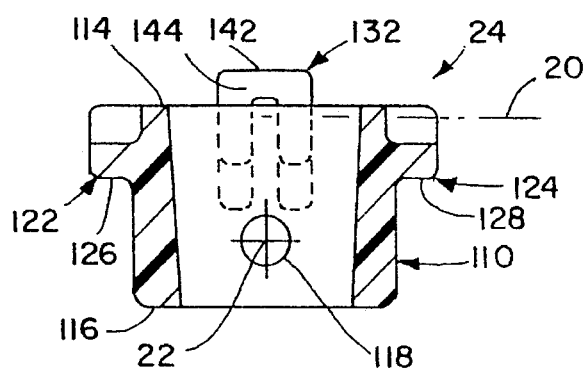
FIG. 6 is a side sectional view taken along the lines VI—VI in FIG. 4.
Figure 7:
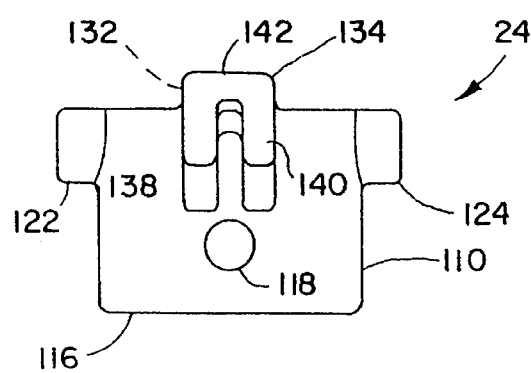
FIG. 7 is an end view of the trunnion shown in FIG. 6.

Trunnion 24 (FIGS. 4–7) includes a cylindrically-shaped body 110 configured to mateably fit within aperture 40 in mount 34. A hole 112 extends generally vertically through body 110 for receiving shift stick 14. Hole 112 is oblong in the direction of first axis 20 so that shift stick 14 can be pivoted therein without interferingly engaging trunnion body 110. Body 110 includes an upper end 114 and a lower end 116 (FIGS. 5 and 6). A bore 118 extends transversely through body 110 in the direction of axis 22 proximate lower end 116. A transversely position pivot pin 28 extends press-fittingly through a hole 120 in shift stick 24 and slideably into bore 118. Pivot pin 28 (FIG. 3) thus defines a pivot for shift stick 14 rotatingly engaging bore 118 and thus for pivoting shift stick 14 or trunnion 24 about second axis 22.

The upper end 114 of trunnion 24 (FIGS. 4 and 6) includes a pair of opposing pivot forming first protrusions 122 and 124 that extend outwardly. First protrusions 122 and 124 define cylindrically-shaped lower surfaces 126 and 128 that slideably engage bearing forming surfaces 46 of mount recesses 42 and 44. Thus, trunnion 24 is pivotally mounted to base 118 by first protrusions 122 and 124. A pair of stabilizing second protrusions or "rocker" arms 132 and 134 (FIGS. 4 and 5) extend outwardly from trunnion body 110. Second protrusions 132 and 134 are orthogonal to pivot forming first protrusions 122 and 124. Second protrusions 132 and 134 slideably engage channels 62 and 64, respectively, to stabilize shift stick 14 and trunnion 24 as shift stick 14 and trunnion 24 are pivoted about first axis 20. Notably, first protrusions 122 and 124 define first axis 20 and pivot pin 28 defines axis 22 in a manner so that each axis can be located at an optimal height relative to transmission 12. Thus, axes 20 and 22 need not be located in intersecting positions. Preferably, first and second protrusions 122, 124, 132 and 134 are shaped in a manner that avoids large masses of material in order to avoid the formation of sinks in the material when molding trunnion 24, such as the "U" shaped sections shown. It is contemplated that trunnion 24 will be made of a polymeric material such as acetal, although alternative materials can also be used.

In the illustrated trunnion 24, first protrusions 122 and 124 have a U-shaped configuration that allows the pivot forming surfaces 126 and 128 to be continuous. Also in the illustrated trunnion 24, second protrusions 132 and 134 have an inverted U shape that includes side legs 138 and 140, and connecting leg 142. Notably, each connecting leg 142 has an inclined upper surface 144 oriented to mateably engage the portion of springs 30 proximate second protrusions 132 and 134. Further, the upper surface 145 of trunnion body 110 is depressed so that upper surfaces 144 define a curvilinear shape generally comparable to or slightly greater than mount upper surface 82. Thus, trunnion 24 can mateably be positioned adjacent spring 84 even when springs 84 are held in the compressed bowed condition against mount upper surface 82 by spring compressing retainer 78.

To assemble shifter 10, shift stick 14 is pivotally mounted to trunnion 24 by pivot pin 28. The assembly of shift stick 14 and trunnion 24 is dropped into base 18 with springs 84 resting on mount upper surface 82. The lower end 16 of shift stick 14 extends through base mount aperture 40, and trunnion 24 mateably engages mount 34. Screws attach retainer 78 to base 18 so that it presses the springs 84 against mount upper surface 82. This causes springs 84 to bow into a prestressed condition. It also positions second protrusions 132 and 134 proximate spring portion 84A and 84B. Cover 96 is then pressed onto or is otherwise secured onto base 18 to seal the assembly.

Once assembled, as shift stick 14 can be pivoted about first axis 20 from side-to-side in the vehicle (FIG. 2). This causes shift stick 14 and trunnion 24 to pivot as a unit. By moving shift stick upper end a distance D1, shift stick transmission engaging end 16 moves a distance G1. Due to the height of first axis 20, which is above second axis 22, shift stick pivots only the desired distance D1 while still pivoting the transmission engaging end 16 of shift stick 14 sufficiently (i.e. distance G1) to operably position the transmission 12 for a second movement. As shift stick 14 is pivoted forwardly (or rearwardly) a distance D2 (FIG. 1), it pivots about second axis 22 and causes shift stick transmission engaging end 16 to move a distance G2. Due to the low position of second axis 22, shift stick 14 provides the operator with a high amount of mechanical advantage (FIG. 1). Thus, when shift loads are encountered (such as when shifting into a gear), the operator easily shifts into the selected gear. Restated, the leverage provided by shift stick 14 is greater when pivoted about axis 22 than when pivoted about axis 20 because the ratio of D2/G2 is greater than the ratio D1/G1. Notably, the level of axes 20 and 22 can be independently set to whatever level is desired, and need not be positioned at the same height relative to the transmission 12.

Thus, there is provided a shifter which utilizes a trunnion to pivotally mount a shift stick to a base, the trunnion pivotally mounting to the base for movement about a first axis and pivotally receiving the shift stick for movement about a second axis orthogonal to the first axis. The second axis is located closer to the transmission than the first axis to provide increased mechanical advantage when an operator is using the shift stick to shift the transmission into gear, which thus allows the operator to more easily overcome transmission shift loads. The trunnion is further configured to engage a spring located on the base when rotated about the first axis to bias the shift stick to a predetermined neutral position but is configured so that the spring is bias neutral when pivoted about the second axis.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A shifter for a manual transmission of a vehicle comprising:

a shift stick having a lower end configured to operably engage the transmission;

a base adapted to pivotally mount said shift stick on the vehicle for movement about first and second nonintersecting orthogonal axes;

a trunnion pivotally mounted to the base for movement about the first axis, and including pivot supporting means for pivotally supporting said shift stick for movement about said second axis;

said shift stick including a pivot member configured to pivotally engage said pivot supporting means on said trunnion;

a plate spring operably mounted to said base in a position engageable by said trunnion for biasing said shift stick to a neutral position about said first axis; and said base including a set of opposing recesses and also including a set of channels positioned orthogonally to said opposing recesses, and said trunnion includes pivot forming protrusions for engaging said opposing recesses and further includes stabilizing protrusions that slideably engage the channels for stabilizing said trunnion during movement thereof.

2. A shifter as defined in claim 1 wherein said trunnion is molded from a polymeric material.

3. A shifter as defined in claim 2 wherein said pivot member includes a pivot pin positioned transversely on said shift stick, said pivot pin including ends pivotally engaging said pivot supporting means on said trunnion.

4. A shifter as defined in claim 1 wherein said second axis is located closer to said transmission than said first axis.

5. A shifter as defined in claim 4 including a retainer secured to said base for holding said spring on said base.

6. A shifter as defined in claim 5 wherein said base includes a shaped surface defining a curvilinear shape when viewed in a direction parallel said first axis and defining linear segments when viewed in a direction parallel said second axis, said spring being compressed to said shaped surface by said retainer.

7. A shifter as defined in claim 1 including a retainer secured to said base for holding said spring on said base, and wherein said base includes a shaped surface defining a curvilinear shape when viewed in a direction parallel said first axis and defining linear segments when viewed in a direction parallel said second axis, said spring being compressed against said shaped surface by said retainer.

8. A shifter for a manual transmission of a vehicle comprising:

a shift stick configured to operably engage the transmission;

a base adapted for mounting to the vehicle and configured to pivotally support said shift stick for movement about first and second orthogonal axes;

a trunnion including first means for pivotally mounting said shift stick to said base for movement about said first axis, and further including second means for pivotally mounting said shift stick to said first means for movement about said second axis, said first and second axes being nonintersecting a disc-shaped spring operably mounted on said base for biasing said shift stick about one of said axes; and said base including a set of opposing recesses and also includes a set of channels positioned orthogonally to said opposing recesses, and wherein said trunnion includes pivot forming protrusions for engaging said opposing recesses and further includes stabilizing protrusions that slideably engage the channels for stabilizing said trunnion during movement thereof, said pivot forming protrusions and said opposing recesses forming said first means and defining said first axis.

9. A shifter as defined in claim 8 wherein said shift stick and said first means are configured to move as a unit when pivoted about said first axis.

10. A shifter as defined in claim 8 wherein said second axis is located closer to said transmission than said first axis.

11. A shifter as defined in claim 8 wherein said trunnion includes a transverse hole and said shift stick includes a pivot pin for rotatably engaging said hole, said pivot pin and said transverse hole forming said second pivot means and defining said second axis.

12. A shifter for a manual transmission comprising:

a shift stick configured to operably engage the transmission;

a base adapted for mounting said shifter to the vehicle and configured to pivotally support said shift stick for movement about first and second orthogonal axes;

a trunnion including first pivot forming surfaces for pivotally engaging said base to define said first axis, and further including second pivot forming surfaces for defining said second axis, said shift stick including a transversely positioned pivot member pivotally engaging said second pivot forming surfaces;

a disc-shaped spring;

said base including a spring receiving surface and a retainer for compressing said spring against said spring receiving surface;

said trunnion including spring engaging protrusions for engaging said spring when said trunnion is moved about said first axis so that said shift stick is biased to a predetermined neutral position about said first axis, said spring engaging protrusions being generally aligned with said second axis so that said spring does not bias said shift stick about said second axis.

13. A shifter as defined in claim 12 wherein said spring is normally planar and washer-like in shape, and said spring receiving surface on said base is curvilinear in at least one direction for receiving and tensioning said spring.

* * * * *

UNITED STATES PATENT AND TRADEMARK OFFICE
CERTIFICATE OF CORRECTION

PATENT NO. : 5,493,931
DATED : February 27, 1996
INVENTOR(S) : Don L. Niskanen

It is certified that error appears in the above-indentified patent and that said Letters Patent is hereby corrected as shown below:

Column 1, Line 27;

"U.S. Pat. No. 07/992,243" should be --U.S. Patent No. 5,313,853--.

Signed and Sealed this

Third Day of September, 1996

Attest:

BRUCE LEHMAN

Attesting Officer

Commissioner of Patents and Trademarks